US012598633B2

(12) United States Patent
Shen

(10) Patent No.: US 12,598,633 B2
(45) Date of Patent: Apr. 7, 2026

(54) ANTI-INTERFERENCE METHOD AND APPARATUS FOR DSS, AND ELECTRONIC DEVICE AND STORAGE MEDIUM

(71) Applicant: ZTE CORPORATION, Shenzhen (CN)

(72) Inventor: Shaowu Shen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 384 days.

(21) Appl. No.: 18/270,016

(22) PCT Filed: Dec. 27, 2021

(86) PCT No.: PCT/CN2021/141652
§ 371 (c)(1),
(2) Date: Jun. 28, 2023

(87) PCT Pub. No.: WO2022/143528
PCT Pub. Date: Jul. 7, 2022

(65) Prior Publication Data
US 2024/0064791 A1 Feb. 22, 2024

(30) Foreign Application Priority Data
Dec. 28, 2020 (CN) .......................... 202011578563.0

(51) Int. Cl.
*H04W 72/541* (2023.01)
*H04W 16/14* (2009.01)

(52) U.S. Cl.
CPC ......... *H04W 72/541* (2023.01); *H04W 16/14* (2013.01)

(58) Field of Classification Search
CPC ... H04W 72/541; H04W 16/14; H04J 11/005; H04L 1/0003; H04L 1/0006;
(Continued)

(56) References Cited

U.S. PATENT DOCUMENTS

| | | | |
|---|---|---|---|
| 2004/0152429 A1 | 8/2004 | Haub et al. | |
| 2012/0087273 A1* | 4/2012 | Koo ...................... | H04W 16/02 370/252 |

(Continued)

FOREIGN PATENT DOCUMENTS

| | | |
|---|---|---|
| CN | 108649991 A | 10/2018 |
| CN | 108834159 A | 11/2018 |

(Continued)

OTHER PUBLICATIONS

European Patent Office, the Extended European Search Report dated Oct. 24, 2024, for corresponding EP application No. 21914264.3.

(Continued)

*Primary Examiner* — Candal Elpenord
(74) *Attorney, Agent, or Firm* — Li & Cai Intellectual Property (USA) Office

(57) ABSTRACT

Disclosed in the present application are an anti-interference method and apparatus for DSS, an electronic device and a storage medium. The anti-interference method for DSS includes: acquiring a radio frequency performance parameter and a communication performance parameter in real time; judging, according to the radio frequency performance parameter and the communication performance parameter, whether interference with DSS is present; classifying, in response to the presence of the interference, the interference according to the radio frequency performance parameter and the communication performance parameter; and performing, according to a classification result, corresponding anti-interference processing on different types of interference.

17 Claims, 5 Drawing Sheets

(58) Field of Classification Search
CPC ..... H04L 1/0009; H04L 1/0015; H04B 15/04; H04B 17/382; H04B 17/345; H04B 1/525
USPC ................................................. 370/329–330
See application file for complete search history.

(56) References Cited

U.S. PATENT DOCUMENTS

| | | | | |
|---|---|---|---|---|
| 2013/0208587 | A1* | 8/2013 | Bala ...................... | H04J 3/1694 |
| | | | | 370/278 |
| 2014/0128088 | A1* | 5/2014 | Farhadi ................ | H04W 24/02 |
| | | | | 455/452.1 |
| 2016/0037544 | A1* | 2/2016 | Wang ................ | H04W 72/1215 |
| | | | | 370/329 |
| 2016/0157103 | A1* | 6/2016 | Teng ................... | H04W 72/541 |
| | | | | 370/329 |
| 2016/0302125 | A1 | 10/2016 | Tejedor et al. | |
| 2017/0041938 | A1* | 2/2017 | Nabar .................. | H04W 16/10 |
| 2020/0106577 | A1* | 4/2020 | Chen ..................... | H04W 72/23 |
| 2020/0359229 | A1 | 11/2020 | Macmullan et al. | |
| 2023/0299899 | A1* | 9/2023 | Chen .................... | H04J 11/0056 |
| | | | | 370/329 |

FOREIGN PATENT DOCUMENTS

| | | |
|---|---|---|
| CN | 108933610 A | 12/2018 |
| CN | 110460352 A | 11/2019 |

OTHER PUBLICATIONS

Menon R., et al., "SON Architecture for Spectrum Sharing Networks", 2014 National Wireless Research Collaboration Symposium, IEEE, Oct. 31, 2014.

CATT: "Remaining issues on L TE/NR coexistence", 3GPP Draft, Nov. 18, 2017.

WIPO, International Search Report issued on Mar. 29, 2022.

Intel Corporation. "Scope update for Rel-17 NR demodulation performance WI: CRS-IM for LTE/NR DSS," 3GPP TSG-RAN Meeting #90-e, Dec. 11, 2020.

* cited by examiner

ANTI-INTERFERENCE METHOD AND APPARATUS FOR DSS, AND ELECTRONIC DEVICE AND STORAGE MEDIUM

CROSS-REFERENCE TO RELATED APPLICATIONS

The present application is based on and claims a priority from the Chinese patent application No. 202011578563.0 filed on Dec. 28, 2020, the entire disclosure of which is incorporated herein by reference.

TECHNICAL FIELD

Embodiments of the present application relate to the field of communications, and in particular, to an anti-interference method for DSS.

BACKGROUND

With an increase of traffic demand of mobile broadband network services, the frequency spectra become denser. Current low band spectrum resources are mostly occupied by 2/3/4G, but since 2/3/4G, especially 4G, will coexist with 5G for a long time, these high-quality low band resources cannot be completely recultivated. Operators have to recultivate 2G/3G networks to 4G, and 4G to 5G, which has become an irresistible trend. Therefore, how to dig out more potential from existing spectrum resources of operators has become a common concern in the industry. The spectrum sharing technology, which can allocate spectrum resources dynamically on demand in a same band, has become an inevitable choice for operators. The Dynamic Spectrum Sharing (DSS) technology means that 4G Long Term Evolution (LTE) and 5G New Radio (NR) are allowed to share a same spectrum, and time-frequency resources are dynamically allocated to 4G and 5G users, as shown in FIG. 1. The use of the DSS technology can improve the spectral efficiency, and facilitate smooth evolution between 4G and 5G. In this manner, old low band resources and base stations of 4G can still be utilized to achieve smooth evolution from 4G to 5G, thereby greatly reducing the investment cost of 5G.

Although DSS is very attractive to operators, there are still many technical challenges, mainly including inter-channel interference problems. Taking DSS of 4G/5G as an example, 4G is a broadband system in which channel configuration is relatively extensive, and control channels, pilot frequency and the like all adopt full-band mapping, while 5G is also a broadband system where various physical channels are present. In some examples, the interference of various physical channels between the two systems is solved by reserving buffer, but this method may reduce an overall spectrum utilization rate of service channels in the DSS process.

SUMMARY

An implementation of the present application provides an anti-interference method for dynamic spectrum sharing (DSS), including: acquiring a radio frequency performance parameter and a communication performance parameter in real time; judging, according to the radio frequency performance parameter and the communication performance parameter, whether interference with DSS is present; classifying, in response to the presence of the interference, the interference according to the radio frequency performance parameter and the communication performance parameter;

and performing, according to a classification result, corresponding anti-interference processing on different types of interference.

An implementation of the present application further provides an anti-interference apparatus for dynamic spectrum sharing (DSS), including: an acquisition module configured to acquire a radio frequency performance parameter and a communication performance parameter in real time; a judgment module configured to judge, according to the radio frequency performance parameter and the communication performance parameter, whether interference with DSS is present; a classification module configured to classify, in response to the presence of the interference, the interference according to the radio frequency performance parameter and the communication performance parameter; and a processing module configured to perform, according to a classification result, corresponding anti-interference processing on different types of interference.

An implementation of the present application further provides an electronic device, including: at least one processor; and a memory in communicative connection with the at least one processor, wherein the memory stores instructions executable by the at least one processor thereon which, when executed by the at least one processor, cause the at least one processor to perform the anti-interference method for DSS as described above.

An implementation of the present application further provides a computer-readable storage medium storing a computer program which, when executed by a processor, causes the anti-interference method for DSS as described above to be implemented.

BRIEF DESCRIPTION OF DRAWINGS

One or more embodiments are illustrated through corresponding figures in the accompanying drawings, but such illustration does not constitute any limitation to the embodiments. Throughout the drawings, elements having like reference numerals represent like elements, and the drawings are not to be construed as limiting in scale unless otherwise specified.

DETAIL DESCRIPTION OF EMBODIMENTS

To make the objects, technical solutions and advantages of the embodiments of the present application clearer, embodiments of the present application will be described in detail below with reference to the accompanying drawings. However, it will be appreciated by those of ordinary skill in the art that numerous technical details are set forth in various embodiments of the present application to provide a better understanding of the present application. However, the technical solutions claimed in the present application can be implemented without these technical details or based on various changes and modifications based on the following embodiments. The following embodiments are divided for convenience of description, and should not constitute any limitation to the specific implementation of the present application, and the embodiments may be mutually incorporated and referred to without contradiction.

The terms "first" and "second" in the embodiments of the present application are merely used for the purpose of illustration and are not to be construed as indicating or implying a relative importance or implicitly indicating the number of the indicated technical features. Therefore, a feature defined by "first" or "second" may include at least one that feature either explicitly or implicitly. In the description of the present application, the terms "include" and "comprise", as well as any variations thereof, are intended to cover a non-exclusive inclusion. For example, a system, product or device that includes a list of elements or units is not limited to including only those elements or units, but may alternatively include other elements or units not expressly listed or inherent to such product or device. In the description of the present application, "a plurality of" means at least two, e.g., two, three, etc., unless explicitly defined otherwise.

Figure 1:
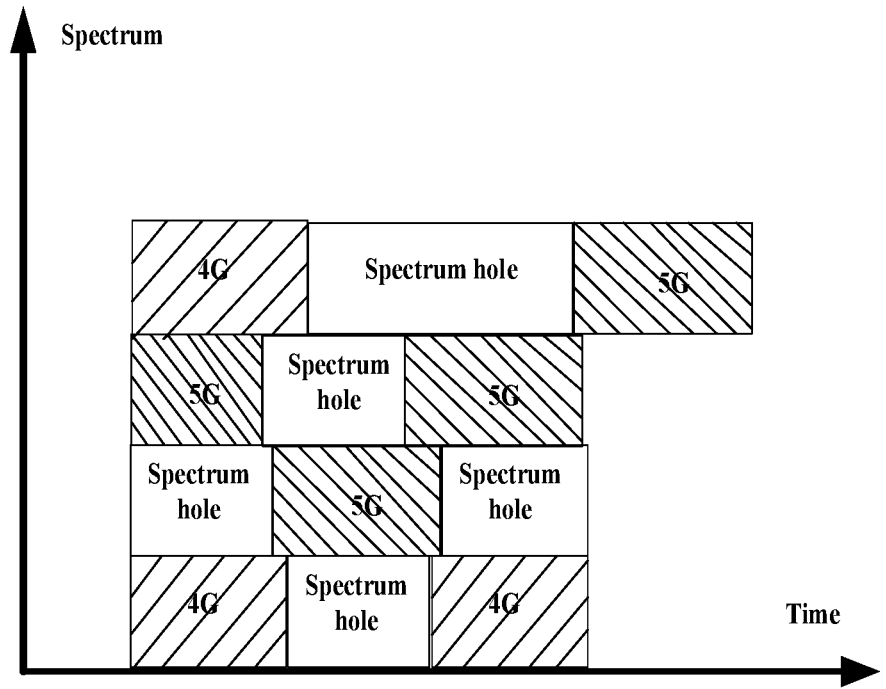
FIG. 1 is a schematic diagram of dynamic spectrum sharing in the related art of the present application.
Figure 2:
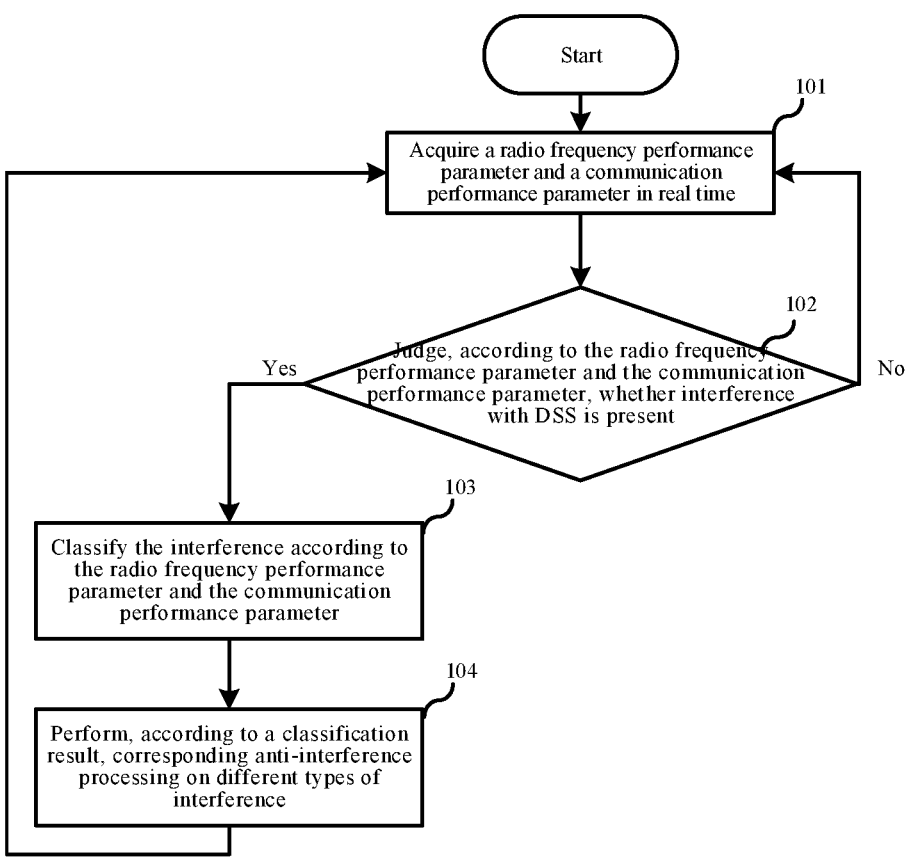
FIG. 2 is a flowchart of an anti-interference method for DSS according to a first embodiment of the present application.

A first implementation of the present application relates to an anti-interference method for DSS, which is applied to an electronic device including various 5G terminals, customer premise equipment (CPE), base stations, and other products using 5G technology, and the specific flow is shown in FIG. 2.

At operation 101, acquiring a radio frequency performance parameter and a communication performance parameter in real time.

At operation 102, judging, according to the radio frequency performance parameter and the communication performance parameter, whether interference with DSS is present; proceeding to operation 103 if the interference with DSS is present; and returning to operation 101 if the interference with DSS is not present.

At operation 103, classifying the interference according to the radio frequency performance parameter and the communication performance parameter.

At operation 104, performing, according to a classification result, corresponding anti-interference processing on different types of interference; and returning to operation 101 for judgment and test after the processing.

The implementation details of the anti-interference method for DSS according to this implementation will be described in detail below, and the following description is provided merely for facilitating understanding of the implementation details and is not necessary for implementing the present solution.

In operation 101, an electronic device supporting a DSS function acquires a radio frequency performance parameter and a communication performance parameter in real time of the electronic device through a test algorithm built in the electronic device. That is, acquisition of the radio frequency performance parameter and the communication performance parameter in real time does not depend on an external test instrument, or an additional radio frequency module or device, such as a power splitter, a combiner, a coupler, a coupling box or the like, or a radio frequency test cable. Instead, it is implemented merely through a self-test algorithm built in an electronic device program and instructions. For example: with a built-in test algorithm, a terminal acquires three transmission indexes in real time, including a power, an error vector magnitude (EVM) and an adjacent channel leakage ratio (ACLR), as well as two reception indexes, including a reference signal receiving power (RSRP) and an estimated sensitivity (SEN). The radio frequency performance parameter includes: EVM, ACLR, RSRP, block error rate (BLER), etc.; and the communication performance parameter including, for example: an uplink and downlink throughput, a bit error rate, a modulation and coding scheme (MCS), and the number of multiple-in multiple-out (MIMO) data streams.

Figure 3:
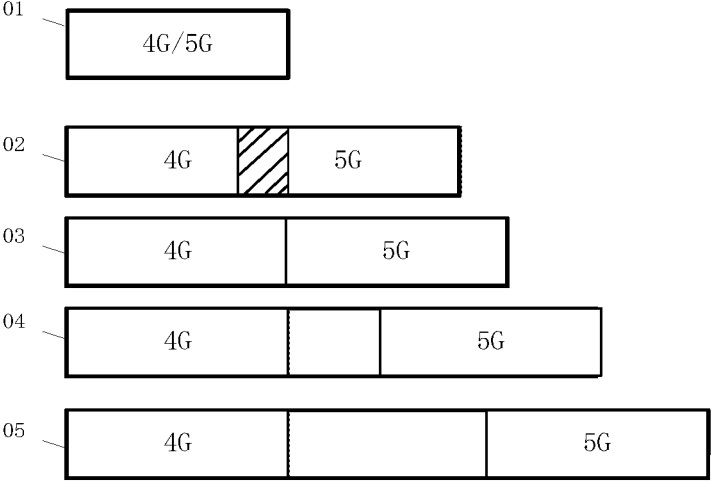
FIG. 3 is a schematic diagram showing causes of interference according to the first embodiment of the present application.

In operation 102, the obtained radio frequency performance parameter and communication performance parameter in real time are compared with preset thresholds of a radio frequency performance index and a communication performance index of DSS without interference, to judge whether interference with DSS is present. For example, the acquired indexes, such as the uplink and downlink throughput, the MCS, the bit error rate and the like, are compared with preset index thresholds of DSS without interference, and if any index exceeds a preset range, it indicates that there is interference in the current operating mode of the electronic device. Interference may occur due to overlapped or adjacent different communication channels, for example, as shown in FIG. 3. In state 01, 100% overlap interference may be generated, in state 02, 20% overlap in-band interference may be generated, in states 03 and 04, adjacent band interference may be generated, and in state 05, harmonic interference, intermodulation interference or spurious interference and the like may be generated.

In an example, when self-test is performed using transmission indexes in the radio frequency performance parameter and the communication performance parameter, the self-test algorithm sends a control instruction in an idle or standby time slot of the terminal, and invokes, according to the transmission indexes acquired in real time, EVM and ACLR index values which are the same as the transmission indexes obtained in real time, to control a transmitter of the terminal to enter a spontaneous mode. Further, the transmission indexes EVM and ACLR of the transmitter are fed back and acquired in a closed-loop mode, and compared with preset thresholds of the transmission indexes EVM and ACLR. For example, the threshold EVM is 3%, and the threshold ACLR is −35 dBc. When the closed-loop feedback device detects that the transmission index EVM of the transmitter exceeds 3% or the ACLR exceeds −35 dBc, it is determined that interference with DSS is present currently. The transmission indexes EVM and ACLR for self-test may be estimated from in-phase quadrature (IQ) signal sampling.

Figure 4:
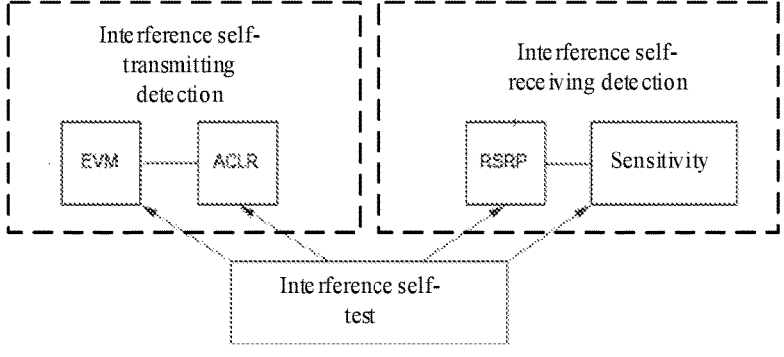
FIG. 4 is a schematic diagram of interference self-test according to the first embodiment of the present application.

In another example, when self-test is performed using reception indexes in the radio frequency performance parameter and the communication performance parameter, the self-test algorithm controls the transmitter to transmit a single-carrier wave (CW) reference signal with the same frequency point and reception level as the shared spectrum, such as a continuous single-tone waveform signal of a signal level with a CELL POWER of −70 dB, which may be a signal having the same frequency as the frequency point of the shared spectrum, or a signal with a certain frequency offset (e.g., 500 Hz) on the basis of the frequency point of the shared spectrum. After being transmitted from the transmitter, the CW is collected by the receiver to be demodulated and used in calculation of received power (RX) at the terminal side/received signal strength indication (RSSI) at the base station side. The read RSRP signal is compared with the transmitted level CELL POWER to determine a difference, which is then compared with a preset threshold (e.g., 3 dB). If the difference is greater than 3 dB, it is determined that there is interference with the currently shared spectrum, and the spectrum frequency point of NR is desired to be adjusted to a position without interference; and if the interference is less than 3 dB or close to 0, it is determined that there is no or acceptable interference with the currently shared spectrum, and there is no need to adjust the spectrum frequency point. A schematic diagram of self-test performed using transmission and/or reception indexes in the radio frequency performance parameter and the communication performance parameter is shown in FIG. 4.

In addition, a system software algorithm may be used to capture the IQ sampling value, a noise factor (NF) value and a thermal noise value between systems, and thus a carrier-to-noise (C/N) ratio from a transceiver to an antenna end of a terminal system is calculated and finally converted into an SEN value. The RSRP value read by the receiver and the converted SEN value are compared with corresponding preset RSRP value and SEN target threshold of DSS without interference, to judge whether interference is present currently. If the preset target threshold RSRP of N3 in DSS without interference is −70+/−2 dB, corresponding to a limit SEN −93 dBm/BW. However, when N3 is in the spectrum sharing mode, the detected RSRP value is −65 dB, and the calculated SEN is −89 dBm/BW, which indicates that the current sharing interference is 4 to 5 dB.

In operation 103, if the judgment result is that there is interference, the interference is classified according to the radio frequency performance parameter and the communication performance parameter acquired in real time. In an example, the interference is classified according to frequency point information and ACLRs of the first communication network and the second communication network, and the second communication network has a network speed higher than the first communication network. For example, the second communication network may be 5G NR, and the first communication network may be 4G LTE.

In an example, the DSS interference includes harmonic interference, intermodulation interference, spurious interference, or the like. Because NR occupies the frequency spectrum of LTE, and sometimes is very close to or even overlaps with LTE, DSS interference is generated. By calculating frequency point information of LTE and NR while monitoring an ACLR sharing spurious value, a type of the interference can be identified. For example, if the frequency points of B1 and N28 are frequency tripled, the interference is harmonic interference. When B1 and N1 are working simultaneously, if the frequency points are very close and the ACLR sharing spurious value is greater than a target threshold, the interference is spurious interference.

In operation 104, according to a classification result, corresponding anti-interference processing is performed on different types of interference. By performing corresponding processing on different types of interference, the anti-interference process can be executed more accurately and efficiently.

If the parameter exceeding the threshold index has obvious changes under different adjustment parameters, it indicates that there is correlation, and a correlation degree is recorded as a correlation coefficient and stored in a memory. Based on the correlation between interference and the adjustment parameters, a corresponding or highly-correlated anti-interference measure is invoked. In addition, there is an AI learning process of correlation, operations of which are performed after a round of effective adjustment is completed. In other words, a model building process of measures and parameters, i.e., the self-learning process of a DSS anti-interference parametric model library, is effectively adjusted to establish a correlation coefficient between each round or a final adjustment measure or parameter and a preset target. If the adjustment is effective, the correlation coefficient is added by 1, and if the adjustment is ineffective, the correlation coefficient is reduced by 1. Through continuous accumulation and learning, the model library of correlation is improved for later more accurate anti-interference adjustment.

Figure 5:
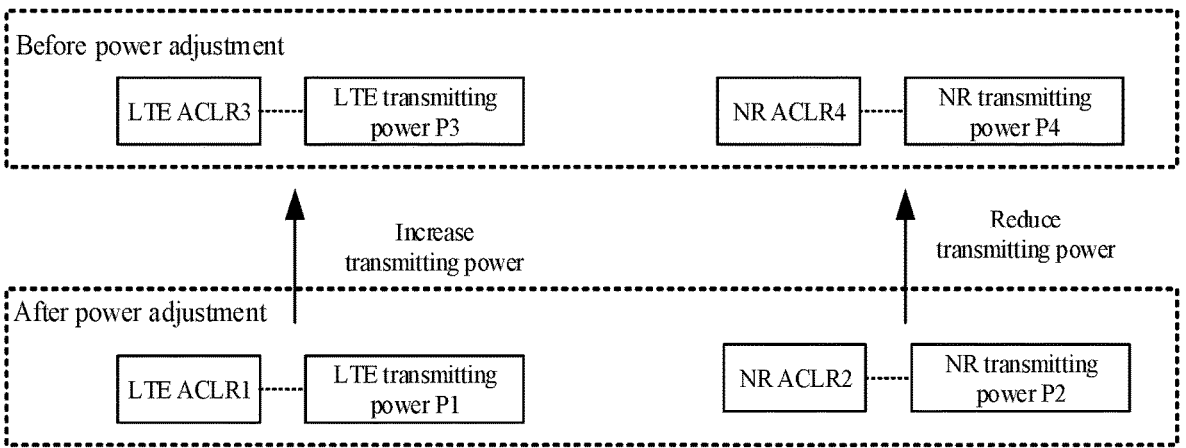
FIG. 5 is a schematic diagram showing anti-interference processing of adjusting a dynamic power according to the first embodiment of the present application.

In an example, the anti-interference processing is performed by adjusting a transmitting power in the dynamic power, which is exemplarily illustrated below for ease of understanding:

When NR is operated in an LTE spectrum range, spuriousness of LTE or NR will cause different uplink and downlink symbol error rates (SER), which in turn causes deterioration of the throughput performance. Therefore, the spurious is desired to be eliminated. One significant manifestation of spurious parameter abnormality is that the transmitting power of LTE or NR in the radio frequency indicators acquired in real time is relatively high, approaching or even reaching a maximum transmission power. In this case, the ACLR margin is relatively small under this power, and the EVM or spurious is in a critical range. Adjustment in the transmitting power can simultaneously influence ACLR, EVM and spurious, and the spurious interference may be subjected to anti-interference processing. Specifically: if a difference between a currently detected transmitting power of LTE and a maximum transmitting power thereof is smaller than a preset first threshold, the current transmitting power of LTE is reduced, and the current transmitting power of NR is increased. If a difference between a currently detected transmitting power of NR and a maximum transmitting power thereof is smaller than a preset second threshold, the current transmitting power of NR is reduced, and the current transmitting power of LTE is increased. When the transmitting power on one side is reduced, the transmitting power on the other side is increased for compensation, as shown in FIG. 5, so that the total transmitting power is not affected while the spurious is suppressed. For example: real-time transmitting powers of LTE and NR are detected, where the transmitting power of NR is 23 dbm, which has reached the maximum transmitting power, while the transmitting power of LTE is 5 dbm. In this case, the transmitting power is adjusted by reducing the transmitting power of NR to 20 dbm, and increasing the transmitting power of LTE to 8 dbm (or any other better power range). After the transmitting power is adjusted, the ACLR, EVM, SER or throughput performance may be further detected in real time to check whether the anti-interference processing for spurious interference is completed.

In an example, the anti-interference processing is performed by adjusting an adaptive modulation parameter. The modulation parameter includes, for example: a MCS, a resource block start (RB start), a resource block number (RB nub), a rank (Rank), a sub-carrier spacing (SCS), or the like.

Taking SCS as an example, LTE uses a fixed SCS at 15 kHz, while NR supports a mixed use of different parameter sets, i.e., allows configuration of different SCSs, such as 15 kHz, 30 kHz, 60 kHz, and the like. NR reduces inter-symbol interference through a windowing/filtering technique for orthogonal frequency division multiplexing (OFDM) signals, but since LTE does not have the windowing/filtering technique, during spectrum sharing of NR and LTE, interference with LTE will occur if NR configures a SCS different from 15 kHz, causing performance loss of LTE. Therefore, firstly, it is detected whether a current SCS is orthogonal. If the current SCS is not orthogonal, the SCS of NR is adjusted to be orthogonal to the SCS of LTE. If the SCS of NR cannot be adjusted, or interference still exists after the SCS is adjusted to be orthogonal, or the original SCS which is not adjusted is in an orthogonal state, other adaptive modulation parameters are adjusted until the detected real-time radio frequency index meets the preset threshold requirement of DSS without interference.

In an example, if the channel frequency points are detected to be overlapped with or adjacent to each other, constraint adjustment is performed on a shared channel according to a channel constraint algorithm. Before performing the processing for interference, channels of LTE or NR are restricted to an available range list, through which interference can be reduced or eliminated. For example, a channel restriction mechanism is introduced into software of the module by modifying a radio frequency driver configuration file. Specifically, when a current electronic device is detected in a DSS operating mode of NR, an operating range or list of coexisting channels of LTE and NR is defined by a channel constraint algorithm of LTE-NR so that only channels within the constrained range or specified available list can be shared, while channels outside the constrained range or specified list are not available and have to be adjusted to channels within the constrained range or specified list. Here, the constraint may be performed through a white list or a black list. In the case of white list, shared spectrum channel values of LTE and NR are specified; and in the case of black list, spectrum channel values which cannot be used by LTE and NR simultaneously are specified. The channel constraint algorithm comes from research and development acquisition values before delivery, and is based on scanning acquisition values of a large number of data models in a scanning range covering combinations of LTE full channels and NR full channels of corresponding frequency bands. By acquiring radio frequency index values such as EVM/ACLR/RSRP/BLER and the like under different channel combinations, the channel constraint algorithm lists channels meeting the preset threshold requirement of DSS without interference as available channels.

The channel constraint is not static but dynamically adjustable, and as the LTE channel changes, the NR channel also changes. The channel combinations in the channel constraint algorithm can be further updated in real time. When new channel combination and condition are generated and interference exists in a current channel, the channel combination and condition will be automatically added and stored in the channel constraint algorithm. In other words, the channel combinations can be automatically learned and supplemented in real time, and meanwhile, available channel combinations and unavailable channel combinations input by a user can be received and marked for real-time updating.

In an example, predetermined processing modes are pre-stored for changes of some non-complex radio frequency and communication performance parameters. In other words, when the interference is judged based on the radio frequency performance parameter and the communication performance parameter, if a pre-stored type of interference is identified, a pre-stored anti-interference mode corresponding to the interference is invoked, thereby reducing dynamic calculation of parameters beyond a normal threshold range, and improving the anti-interference processing efficiency.

In addition, the data preset in the storage space further includes: radio frequency performance parameters and communication performance parameters under different spectrum coincidence modes of NR and LTE; and NR radio frequency index values in different channel ranges. For example, an NR channel is divided into three segments of high, medium, and low HMLs, or a plurality of segments ABCDEF according to interference degradation degrees under the ENDC.

In this implementation, the interference generated in the dynamic spectrum sharing process is classified according to the radio frequency index, and subjected to corresponding processing according to a classification result. Therefore, the anti-interference processing is more targeted without reducing the spectrum utilization rate, and the anti-interference processing efficiency is improved. Meanwhile, as the radio frequency performance parameter and the communication performance parameter are values obtained in real time, real-time feedback can be obtained after the anti-interference processing to check whether interference still exists, which guarantees the degree of completion of the anti-interference processing. In other words, the implementation of the present application can solve the self-interference problem of current 5G terminals in the DSS process, improve the spectrum anti-interference performance of 2/3/4G and 5G NR, prevent deterioration of transmission indexes caused by collisions or interference in the dynamic process, receive a greater bit error, and further improve the performance and effects of 5G peak upload and download throughput of the terminal.

Figure 6:
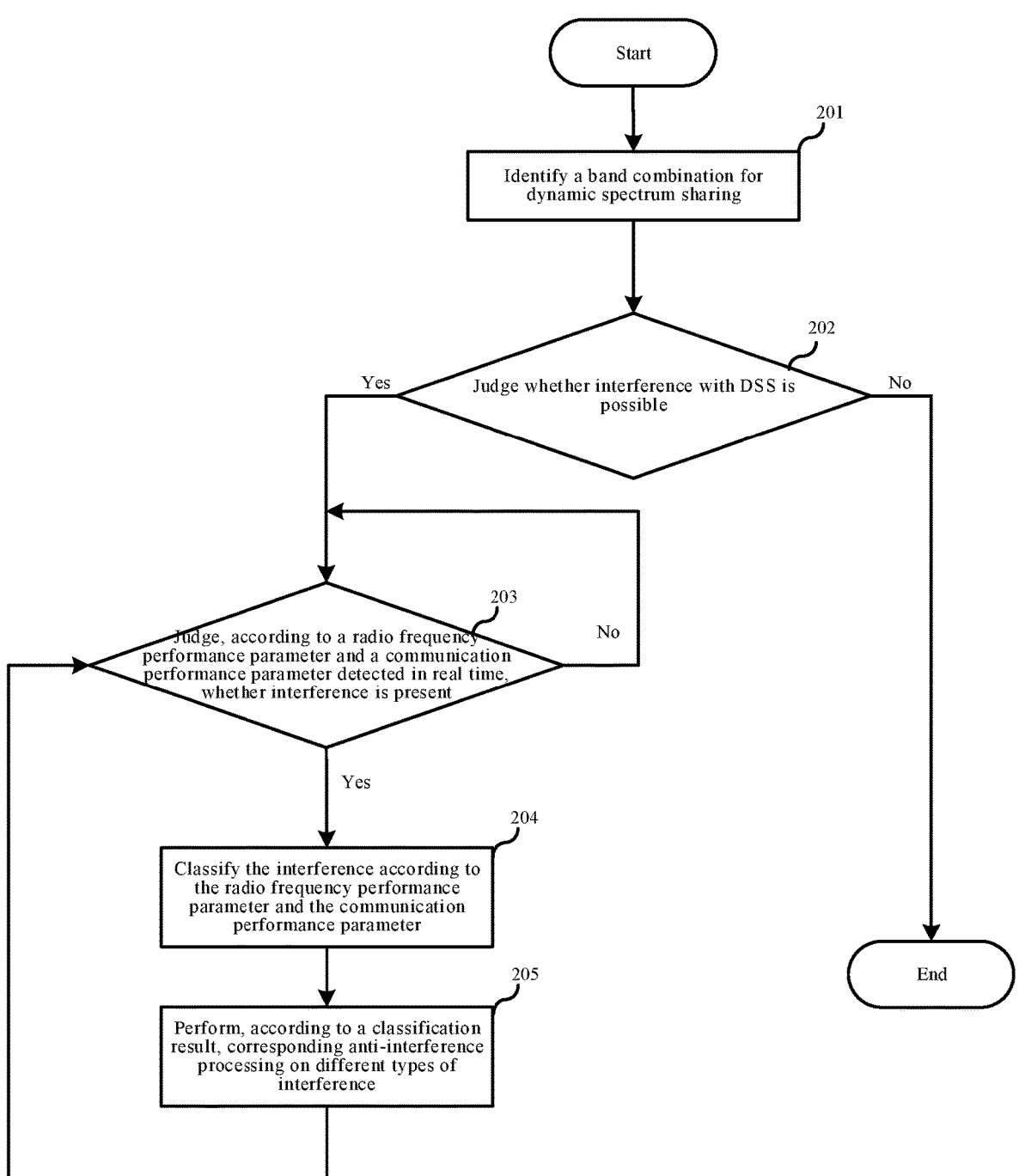
FIG. 6 is a flowchart of an anti-interference method for DSS according to a second embodiment of the present application.

A second implementation of the present application relates to an anti-interference method for DSS, the specific flow of which is shown in FIG. 6.

At operation 201, identifying a band combination for dynamic spectrum sharing (DSS).

At operation 202, judging, according to the identified band combination for DSS, whether interference with DSS is possible, proceeding to operation 203 if interference with DSS is possible; and ending the flow if interference with DSS is impossible.

At operation 203, judging, according to a radio frequency performance parameter and a communication performance parameter detected in real time, whether interference is present, proceeding to operation 204 if interference is present; and returning to operation 203 if interference is not present.

At operation 204, classifying the interference according to the radio frequency performance parameter and the communication performance parameter.

At operation 205, performing, according to a classification result, corresponding anti-interference processing on different types of interference, and returning to operation 203 after the processing.

Operations 203 to 205 are substantially the same as those of the first implementation, and thus are not repeated here to avoid repetition. The main difference lies in operations 201 and 202, implementation details of which are explained in detail below.

In operation 201, before acquiring the radio frequency performance parameter and the communication performance parameter in real time, electronic device system software may be used to capture reported sharing information to identify a band combination for dynamic spectrum sharing, that is, which bands of NR and LTE share a spectrum, such as B1-N1, B3-N3, B28-N28, B66-N66, B71-N71, and the like.

In addition, it is identified whether the electronic device is currently in a standalone (SA) or non-standalone (NSA) mode, or a single NR mode, or a new radio-carrier aggregation (NR-CA) mode. In the case of an NSA mode, LTE and NR band point information under E-UTRA-NR-Dual Connectivity (EN-DC) is also desired to be collected, and in the case of an NR-CA mode, band frequency point information of NR-CA is also desired, such as N3-N78. In the case of a 4G long term evolution-carrier aggregation (LTE-CA) plus EN-DC mode, band frequency point information of both LTE-CA and NR, such as B1-B3-N3-N78, is desired to be collected. The identification result is stored on a memory to be used as an auxiliary reference value for further interference identification and classification.

In operation 202, according to the identified band combination for dynamic spectrum sharing, it is judged whether interference with DSS is present. If the identification result indicates that there is no band combination for dynamic spectrum sharing, it indicates that there is no interference with DSS, and the process is directly ended. If there is a band combination for dynamic spectrum sharing, it indicates that there may be interference with DSS, so the flow goes to operation 203 of judging, according to a radio frequency performance parameter and a communication performance parameter detected in real time, whether interference is present.

In an example, before acquiring the radio frequency performance parameter and the communication performance parameter in real time, a state of the currently shared frequency spectrum between the first communication network and the second communication network is detected, where the first communication network may be LET, and the second communication network may be NR. If LTE and NR do not have a shared frequency spectrum currently, subsequent anti-interference processing for DSS is not needed. If LTE and NR do not work simultaneously in the currently shared frequency spectrum or have a spectral spacing (for example, LTE and NR are in a high channel range and a low channel range, respectively), the interference state is known, and preset anti-interference parameters can be invoked for processing without acquiring the radio frequency performance parameter and the communication performance parameter in real time for judgment, classification and corresponding anti-interference processing. If LTE and NR have a shared frequency spectrum currently, and there is no spectral spacing in the currently shared frequency spectrum of LTE and NR, i.e., there may be uncontrolled interference with an unknown state, so the radio frequency performance parameter and the communication performance parameter in real time are desired to be acquired for later judgment, classification and corresponding anti-interference processing. Through this operation, controllable interference can be identified, and the calculation process for processing of the controllable interference can be shortened, thereby increasing the processing efficiency and improving the user experience.

Figure 7:
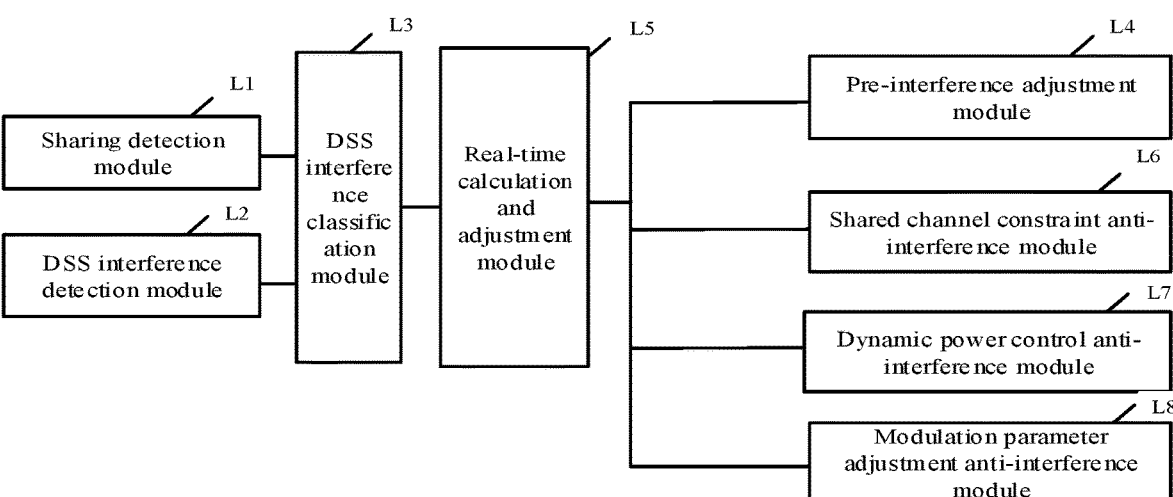
FIG. 7 is a block diagram of anti-interference method for DSS according to the second embodiment of the present application.

A schematic block diagram of the system in a DSS state in this implementation is shown in FIG. 7, in which a sharing detection module L1 is configured to identify, according to the reported sharing information, a band combination and an operating mode for dynamic spectrum sharing; a DSS interference detection module L2 is configured to judge, according to the radio frequency performance parameter and the communication performance parameter, whether interference with DSS is present; a DSS interference classification module L3 is configured to classify the interference according to the radio frequency performance parameter and the communication performance parameter; a pre-interference adjustment module L4 is configured to invoke preset anti-interference parameters to process a known and relatively simple interference state; a real-time calculation and adjustment module L5 is configured to perform calculation and analysis according to the acquired radio frequency performance parameter and communication performance parameter in real time, and invoke a corresponding anti-interference processing module to perform corresponding processing; a shared channel constraint anti-interference module L6 is configured to perform constraint and adjustment on a channel; a dynamic power control anti-interference module L7 is configured to process spurious interference; a modulation parameter adjustment anti-interference module L8 is configured to process harmonic interference and intermodulation interference; and meanwhile, there is a parameter storage module (not shown) connected to each operation and judgment module, to provide parameter support during the anti-interference processing.

Specifically, the parameter storage module may contain: different radio frequency transceiving index values and field measurement index values under different spectrum coincidence modes of NR and LTE, i.e., index parameter values under a dynamic spectrum sharing mode; NR radio frequency index values in different channel ranges. For example, an NR channel is divided into three segments of high, medium, and low HMLs, or a plurality of segments ABCDEF according to interference degradation degrees under random access EUTRA-NR dual connectivity (ENDC); transmission index values of different target transmitting powers in a non-dynamic power sharing mode, and transmission index values thereof in a dynamic power sharing mode; and different modulation factors, such as different numbers of RBs, MCS, transmission index values at SLOT, and throughput and error code values at different receive gains and receive levels. The pre-interference adjustment module L4, the shared channel constraint anti-interference module L6, the dynamic power control anti-interference module L7 and the modulation parameter adjustment anti-interference module L8 may perform anti-interference processing according to the parameters stored in the parameter storage module.

The pre-interference adjustment module L4 is mainly used for anti-interference adjustment when the dynamic sharing is not very complicated. For example, in the spectrum used by NR, LTE used in a same period is not working at the same time, while other LTE bands are working. For example, when N3 is working, B3 is not working, and only B1 is working. Secondly, B3 and N3 are working simultaneously but in different spectral ranges. B3 is in a lower channel range while N3 is in a higher channel range, with some spectral spacing between the two. The interference state between the two is known. In other words, the pre-interference adjustment module L4 may be invoked to limit LTE and NR in different spectral ranges, or the anti-interference processing modules L6 to L8 are invoked to perform adjustment and optimization.

The real-time calculation and adjustment module L5 is connected to each of the anti-interference processing modules L4 and L6 to L8, and is mainly used for anti-interference adjustment in the case of calculating dynamic sharing. When NR and LTE are in frequency spectrum sharing under a same and interleaving band, the frequency points are in dynamic change and not easy to divide and preprocess. In this case, the real-time calculation and adjustment module is desired to be invoked to monitor and calculate the current interference in real time, and update a calculation result to the parameter storage module in real time. Meanwhile, the anti-interference processing modules L6 to L8 are invoked to perform adjustment and optimization.

In this embodiment, firstly, it is detected whether there is a currently shared frequency spectrum between the first communication network and the second communication network; and when spectrum sharing is determined to be present, real-time parameters are further received to judge whether interference is present, and to perform anti-interference processing. Useless processes of receiving DSS parameters and judging interference are avoided, and system resources occupied by the device for anti-interference processing are reduced.

The division of operations of any of the above methods is merely for clarity, and in implementations, these operations may be combined into one, or a certain operation may be split into a plurality of operations, which both fall into the protection scope of the present disclosure as long as a same logical relationship is included. Any insignificant modification added or any insignificant design introduced to the algorithms or processes without changing core designs of the algorithms or flows falls into the protection scope of the present disclosure.

Figure 8:
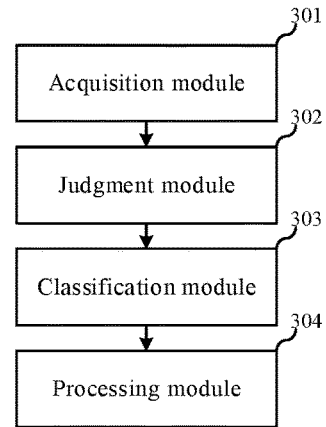
FIG. 8 is a schematic diagram of an apparatus used in an anti-interference method for DSS according to a third embodiment of the present application.

A third implementation the present application relates to an anti-interference apparatus for dynamic spectrum sharing (DSS) which, as shown in FIG. 8, includes:

an acquisition module 301 configured to acquire a radio frequency performance parameter and a communication performance parameter in real time;

a judgment module 302 configured to judge, according to the radio frequency performance parameter and the communication performance parameter, whether interference with DSS is present;

a classification module 303 configured to classify, if interference is present, the interference according to the radio frequency performance parameter and the communication performance parameter; and a processing module 304 configured to perform, according to a classification result, corresponding anti-interference processing on different types of interference.

For the acquisition module 301, in an example, before acquiring the radio frequency performance parameter and the communication performance parameter in real time, it is detected whether there is a currently shared frequency spectrum between the first communication network and the second communication network; and if there is a currently shared frequency spectrum between the first communication network and the second communication network, and the first communication network and the second communication network do not have a spectral spacing in the shared frequency spectrum, the operation of acquiring the radio frequency performance parameter and the communication performance parameter in real time is performed again.

For the judgment module 302, in an example, the radio frequency performance parameter and the communication performance parameter are compared with preset thresholds of a radio frequency performance index and a communication performance index of DSS without interference, to judge whether interference with DSS is present.

For the classification module 303, in an example, the interference is classified according to frequency point information and adjacent channel leakage ratios (ACLRs) of the first communication network and the second communication network. Types of the interference include harmonic interference, intermodulation interference, and spurious interference. The second communication network has a network speed higher than the first communication network.

For the processing module 304, a dynamic power in DSS is adjusted, including, for example: detecting a current transmitting power of the first communication network and a current transmitting power of the second communication network; if a difference between the current transmitting power of the first communication network and a maximum transmitting power of the first communication network is smaller than a preset first threshold, reducing the current transmitting power of the first communication network, and increasing the current transmitting power of the second communication network; and if a difference between the current transmitting power of the second communication network and a maximum transmitting power of the second communication network is smaller than a preset second threshold, reducing the current transmitting power of the second communication network, and increasing the current transmitting power of the first communication network.

An adaptive modulation parameter is adjusted, including, for example: detecting whether a current SCS is orthogonal; if the SCS is not orthogonal, adjusting the SCS of the second communication network to be orthogonal to the SCS of the first communication network. If the SCS adjustment fails or interference still exists after the SCS is adjusted to be orthogonal, the adaptive modulation parameter of the second communication network is adjusted.

If the interference is channel interference, constraint adjustment is performed on a shared channel according to a channel constraint algorithm. The channel interference includes overlapped or adjacent channel frequency points.

In this implementation, the interference generated in the dynamic spectrum sharing process is classified according to the radio frequency index, and subjected to corresponding processing according to a classification result. Therefore, the anti-interference processing is more targeted without reducing the spectrum utilization rate, and the anti-interference processing efficiency is improved. Meanwhile, as the radio frequency performance parameter and the communication performance parameter are values obtained in real time, real-time feedback can be obtained after the anti-interference processing to check whether interference still exists, which guarantees the degree of completion of the anti-interference processing. In other words, the implementation of the present application can solve the self-interference problem of current 5G terminals in the DSS process, improve the spectrum anti-interference performance of 2/3/4G and 5G NR, prevent deterioration of transmission indexes caused by collisions or interference in the dynamic process, receive a greater bit error, and further improve the performance and effects of 5G peak upload and download throughput of the terminal.

It is not difficult to find that this implementation is a system embodiment corresponding to the foregoing implementation, and may be implemented in cooperation with the foregoing implementation. Related technical details mentioned in the foregoing implementation are still valid in this implementation, and are not described here again to reduce repetition. Accordingly, related technical details mentioned in this implementation are also applicable to the foregoing implementation.

It should be noted that all modules referred to in this implementation are logic modules, and in practical applications, one logic unit may be one physical unit, or a part of one physical unit, or may be implemented by a combination of multiple physical units. In addition, in order to highlight the innovative part of the present application, units which are not so closely related to solving the technical problem proposed by the present application are not introduced in the implementation, but this does not indicate that no other unit is present in the implementation.

Figure 9:
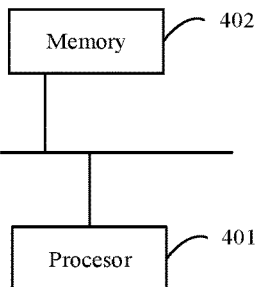
FIG. 9 is a schematic diagram of an electronic device according to a fourth embodiment of the present application.

A fourth implementation the present application relates to an electronic device which, as shown in FIG. 9, includes at least one processor 401; and a memory 402 in communicative connection with the at least one processor 401. The memory stores instructions executable by the at least one processor thereon which, when executed by the at least one processor, cause the at least one processor to perform the anti-interference method for DSS as described above.

The memory and processor are connected via a bus. the bus may include any number of interconnected buses and bridges, and connect various circuits of one or more processors and the memory together. The bus may also connect various other circuits such as peripherals, voltage regulators, power management circuits, and the like, which are well known in the art and, therefore, will not be described in further details herein. A bus interface provides an interface between the bus and a transceiver. The transceiver may include one or more elements, such as a plurality of receivers and transmitters, to provide a unit for communicating with various other apparatuses over a transmission medium. Data processed by the processor is transmitted over a wireless medium through an antenna which further receives data and transmits the data to the processor.

The processor is responsible for managing the bus and general processing, and may further provide various functions including timing, peripheral interfaces, voltage regulation, power management, and other control functions. The memory may be configured to store data used by the processor during operation.

A fifth implementation the present application relates toa computer readable storage medium with a computer program stored thereon. The computer program is executed by a processor to implement any of the above method embodiments.

That is, as can be understood by those skilled in the art, all or part of the operations in any of the method embodiments described above may be implemented by a program instructing related hardware, where the program is stored in a storage medium and includes several instructions to enable a device (which may be a single chip, a chip, or the like) or a processor to perform all or part of the operations in the method described in any of the above embodiments of the present application. The storage medium mentioned before includes: a U Disk, a mobile hard disk, a read-only memory (ROM), a random access memory (RAM), a disk or optical disk, and other media that can store a program code.

It will be understood by those of ordinary skill in the art that the foregoing implementations are specific embodiments of the present application, and that, in practical applications, various changes in form and details may be made therein without departing from the spirit and scope of the present application.

What is claimed is:

1. An anti-interference method for dynamic spectrum sharing (DSS), comprising:
   acquiring a radio frequency performance parameter and a communication performance parameter in real time;
   judging, according to the radio frequency performance parameter and the communication performance parameter, whether interference with DSS is present;

classifying, in response to the presence of the interference, the interference according to the radio frequency performance parameter and the communication performance parameter; and performing, according to a classification result, corresponding anti-interference processing on different types of interference;

wherein before acquiring the radio frequency performance parameter and the communication performance parameter in real time, the method comprises:

detecting whether there is a currently shared frequency spectrum between the first communication network and the second communication network; and responsive to determining that there is a currently shared frequency spectrum between the first communication network and the second communication network, and the first communication network and the second communication network do not have a spectral spacing in the shared frequency spectrum, performing the operation of acquiring the radio frequency performance parameter and the communication performance parameter in real time again.

2. The anti-interference method for DSS according to claim 1, wherein the classifying the interference according to the radio frequency performance parameter and the communication performance parameter comprises:

classifying the interference according to frequency point information and radio frequency performance parameters of a first communication network and a second communication network, wherein a type of the interference includes one or any combination of: harmonic interference, intermodulation interference, spurious interference, or channel interference; and the second communication network has a network speed higher than the first communication network.

3. The anti-interference method for DSS according to claim 2, wherein the performing corresponding anti-interference processing on different types of interference comprises one or any combination of:

performing constraint adjustment on a shared channel according to a channel constraint algorithm;

adjusting a dynamic power in the DSS; and adjusting an adaptive modulation parameter, wherein the adaptive modulation parameter comprises one or any combination of: sub-carrier spacing (SCS) of 5G new radio (NR), modulation and coding scheme (MCS), resource block (RB), time slot (SLOT) or symbol (SYMBOL).

4. The anti-interference method for DSS according to claim 3, wherein the adjusting the dynamic power in the DSS comprises:

detecting a current transmitting power of the first communication network and a current transmitting power of the second communication network;

responsive to determining that a difference between the current transmitting power of the first communication network and a maximum transmitting power of the first communication network is smaller than a preset first threshold, reducing the current transmitting power of the first communication network, and increasing the current transmitting power of the second communication network; and responsive to determining that a difference between the current transmitting power of the second communication network and a maximum transmitting power of the second communication network is smaller than a preset second threshold, reducing the current transmitting power of the second communication network, and increasing the current transmitting power of the first communication network.

5. The anti-interference method for DSS according to claim 1, wherein the performing, according to the classification result, corresponding anti-interference processing on different types of interference comprises:

performing, according to the classification result, corresponding anti-interference processing on different types of interference according to a correlation coefficient, wherein the correlation coefficient is updated in real time according to a processing result of the anti-interference processing on the different types of interference.

6. The anti-interference method for DSS according to claim 1, wherein the acquiring the radio frequency performance parameter and the communication performance parameter in real time comprises:

acquiring, through a test algorithm, the radio frequency performance parameter and the communication performance parameter in real time in a self-sending and self-receiving mode.

7. An electronic device, comprising:

at least one processor; and a memory in communicative connection with the at least one processor, wherein the memory stores instructions executable by the at least one processor thereon which, when executed by the at least one processor, cause the at least one processor to implement the anti-interference method for DSS according to claim 1.

8. A non-transitory computer readable storage medium storing a computer program which, when executed by a processor, causes the anti-interference method for DSS according to claim 1 to be implemented.

9. The anti-interference method for DSS according to claim 2, wherein the performing, according to the classification result, corresponding anti-interference processing on different types of interference comprises:

performing, according to the classification result, corresponding anti-interference processing on different types of interference according to a correlation coefficient, wherein the correlation coefficient is updated in real time according to a processing result of the anti-interference processing on the different types of interference.

10. The anti-interference method for DSS according to claim 3, wherein the performing, according to the classification result, corresponding anti-interference processing on different types of interference comprises:

performing, according to the classification result, corresponding anti-interference processing on different types of interference according to a correlation coefficient, wherein the correlation coefficient is updated in real time according to a processing result of the anti-interference processing on the different types of interference.

11. The anti-interference method for DSS according to claim 4, wherein the performing, according to the classification result, corresponding anti-interference processing on different types of interference comprises:

performing, according to the classification result, corresponding anti-interference processing on different types of interference according to a correlation coefficient, wherein the correlation coefficient is updated in real time according to a processing result of the anti-interference processing on the different types of interference.

12. The anti-interference method for DSS according to claim 2, wherein the acquiring the radio frequency performance parameter and the communication performance parameter in real time comprises:

acquiring, through a test algorithm, the radio frequency performance parameter and the communication performance parameter in real time in a self-sending and self-receiving mode.

13. The anti-interference method for DSS according to claim 3, wherein the acquiring the radio frequency performance parameter and the communication performance parameter in real time comprises:

acquiring, through a test algorithm, the radio frequency performance parameter and the communication performance parameter in real time in a self-sending and self-receiving mode.

14. The anti-interference method for DSS according to claim 4, wherein the acquiring the radio frequency performance parameter and the communication performance parameter in real time comprises:

acquiring, through a test algorithm, the radio frequency performance parameter and the communication performance parameter in real time in a self-sending and self-receiving mode.

15. The anti-interference method for DSS according to claim 5, wherein the acquiring the radio frequency performance parameter and the communication performance parameter in real time comprises:

acquiring, through a test algorithm, the radio frequency performance parameter and the communication performance parameter in real time in a self-sending and self-receiving mode.

16. The anti-interference method for DSS according to claim 1, wherein the acquiring the radio frequency performance parameter and the communication performance parameter in real time comprises: acquiring, through a test algorithm, the radio frequency performance parameter and the communication performance parameter in real time in a self-sending and self-receiving mode.

17. An anti-interference apparatus for dynamic spectrum sharing (DSS), comprising:

a receiver configured to acquire a radio frequency performance parameter and a communication performance parameter in real time;

a decision generator configured to judge, according to the radio frequency performance parameter and the communication performance parameter, whether interference with DSS is present;

a classifier configured to classify, in response to the presence of the interference, the interference according to the radio frequency performance parameter and the communication performance parameter; and a processor configured to perform, according to a classification result, corresponding anti-interference processing on different types of interference;

wherein the receiver further configured to detect whether there is a currently shared frequency spectrum between the first communication network and the second communication network; and responsive to determining that there is a currently shared frequency spectrum between the first communication network and the second communication network and the first communication network and the second communication network do not have a spectral spacing in the shared frequency spectrum, perform the operation of acquiring the radio frequency performance parameter and the communication performance parameter in real time again.

\* \* \* \* \*